US008736603B2

(12) United States Patent
Curington (10) Patent No.: US 8,736,603 B2
(45) Date of Patent: May 27, 2014

(54) COMPRESSION OF TEXTURE RENDERED WIRE MESH MODELS

(75) Inventor: Ian Curington, Windsor (GB)

(73) Assignee: Visual Technology Services Limited (GB)

( * ) Notice: Subject to any disclaimer, the term of this patent is extended or adjusted under 35 U.S.C. 154(b) by 150 days.

(21) Appl. No.: 13/287,472

(22) Filed: Nov. 2, 2011

(65) Prior Publication Data
US 2013/0106834 A1  May 2, 2013

(51) Int. Cl.
*G06T 15/00* (2011.01)
*G06T 19/00* (2011.01)

(52) U.S. Cl.
USPC ............ 345/419; 345/421; 345/423; 345/581

(58) Field of Classification Search
CPC ......... G06T 15/00; G06T 19/20; G06T 17/00; G06T 19/00; G06T 15/04
USPC .......................................... 345/419, 423, 581
See application file for complete search history.

(56) References Cited

U.S. PATENT DOCUMENTS

| | | | | |
|---|---|---|---|---|
| 6,208,347 | B1 * | 3/2001 | Migdal et al. | 345/419 |
| 6,496,601 | B1 * | 12/2002 | Migdal et al. | 382/239 |
| 6,573,890 | B1 * | 6/2003 | Lengyel | 345/419 |
| 6,606,095 | B1 * | 8/2003 | Lengyel et al. | 345/473 |
| 6,614,428 | B1 * | 9/2003 | Lengyel | 345/420 |
| 7,436,981 | B2 * | 10/2008 | Pace | 382/103 |
| 7,733,956 | B1 * | 6/2010 | Kalra et al. | 375/240.1 |
| 8,207,965 | B2 * | 6/2012 | Vinchon | 345/420 |
| 8,416,236 | B1 * | 4/2013 | Hickman et al. | 345/419 |
| 2005/0104889 | A1 * | 5/2005 | Clemie et al. | 345/522 |
| 2005/0168460 | A1 * | 8/2005 | Razdan et al. | 345/419 |
| 2006/0119599 | A1 * | 6/2006 | Woodbury | 345/420 |
| 2007/0242894 | A1 * | 10/2007 | Kautzer et al. | 382/243 |
| 2011/0157197 | A1 * | 6/2011 | Clemie et al. | 345/522 |
| 2011/0285708 | A1 * | 11/2011 | Chen et al. | 345/420 |
| 2012/0075302 | A1 * | 3/2012 | Cai et al. | 345/420 |

(Continued)

FOREIGN PATENT DOCUMENTS

WO       2008/008612 A2    1/2008
WO    WO 2008008612 A2 *  1/2008  .............. G06T 17/20

OTHER PUBLICATIONS

Gabriel Taubin; Geometric Compression Through Topological Surgery; Apr. 1998; Journal ACM Transactions on Graphics (TOG); vol. 17, Issue 2; pp. 84-115.*

(Continued)

*Primary Examiner* — Kimbinh T Nguyen
(74) *Attorney, Agent, or Firm* — Monument IP Law Group (57) ABSTRACT

Spatial errors identifying differences between spatial co-ordinates of vertices of a mesh surface defined by mesh data and corresponding vertices in a mesh surface generated from an encoded representation of the mesh data are determined. Mesh data and texture co-ordinate data associating vertices of a mesh surface with locations in an image space of an image to be rendered onto the mesh surface are then processed to determine mapping between the co-ordinate space of the mesh data and the image space of an image to be rendered onto the mesh surface. Texture co-ordinate data for each vertex is then modified to associate a vertex with a location in image space which differs from the location identified by the unmodified texture co-ordinate data by an amount corresponding to the projection the spatial errors associated with the vertex to the image space.

28 Claims, 7 Drawing Sheets

(56) References Cited

U.S. PATENT DOCUMENTS

| | | | |
|---|---|---|---|
| 2012/0075317 A1* | 3/2012 | Clemie et al. | 345/522 |
| 2012/0262444 A1* | 10/2012 | Stefanoski et al. | 345/419 |
| 2013/0024545 A1* | 1/2013 | Sheppard et al. | 709/217 |

OTHER PUBLICATIONS

Karni, et al., "Compression of soft-body animation sequences", Computers & Graphics, 28 (2004), pp. 25-34.

* cited by examiner

COMPRESSION OF TEXTURE RENDERED WIRE MESH MODELS

FIELD

The present invention relates generally to data compression and particularly to compression of texture rendered wire mesh models.

BACKGROUND

Texture-mapped 3D graphics models ordinarily consist of three parts: a geometric mesh component, texture render data, and texture co-ordinate data.

Typically a geometric mesh component comprises data defining the geometry and connectivity of a plurality of triangles or other polygons which together define a wire mesh surface. Texture render data is typically represented by a 2 dimensional image and texture co-ordinate data comprises set of pairs of uv co-ordinates which define a mapping between vertices on the geometric mesh to the 2D image pixel co-ordinate space. The mapping defined by the texture co-ordinate data enables portions of the 2D image defined by the texture render data to be projected onto individual triangles in the mesh. Normally uv texture co-ordinates are normalized in the range 0.0-1.0, covering the image where U defines left-right relative location on the image, and V defines the vertical y location on the image. Therefore uv values (0.5, 0.5) specify the center of the image. uv texture co-ordinates are usually specified in single precision 32-bit floating point representation.

A triangle mesh representation of a complex, three-dimensional object requires a large volume of data. However, the communication lines through which such data may be transferred over the Internet or other networks typically have a limited average rate of data transfer, commonly referred to as bandwidth. Therefore, it is important to compress data objects as best possible before transfer. Similar issues arise with the storage of data representing complex texture rendered surfaces. The better the compression method which is used, the more data can be transferred in a given amount of time or the greater amount of data which can be stored for a given resource.

There are well-known techniques for compressing 2D image data such as is used to represent texture data. Techniques include run-length encoding and color quantization, such as are used in JPEG, and PNG image standards.

Similarly there are known 3D polygon mesh compression techniques such as those disclosed in "Highly Compressed Tessellation (PRC-HCT)" in ISO24517-1:2008 PDF/E SC2N570-PRC-WD.pdf (21 Jul. 2009 Edition) available for download from http://pdf.editme.com/PDFE which is hereby incorporated by reference.

Having reduced the size of a data set for a triangular mesh using the PRC-HCT approach, the processed data can then be further compressed using conventional data compression algorithms such as the Deflate algorithm in zLib written by Jean-Loup Gailly and Mark Adler which is hereby incorporated by reference.

Greater levels of compression of can be achieved using lossy compression techniques which sacrifice some of the accuracy of the representation of a wire mesh by for example truncation or quantization of the vectors representing a surface to increase the amount of repetition of data and hence increase the susceptibility of data to compression.

Although, data compression techniques exist, further improvement is desirable, either by obtaining greater compression rates or by reducing the appearance of errors in data compressed to a certain file size.

SUMMARY

In accordance with one aspect of the present invention there is provided a computer implemented method of processing mesh data defining the spatial co-ordinates in a co-ordinate space of vertices of a mesh surface and texture co-ordinate data associating vertices of a mesh surface with locations in an image space of an image to be rendered onto the mesh surface, the method comprising: determining for each of the vertices of a mesh surface represented by mesh data, spatial error vectors identifying the differences in between spatial co-ordinates of vertices of the mesh surface as defined by the mesh data and the spatial co-ordinates of corresponding vertices in a mesh surface generated from an encoded representation of the mesh data; determining a mapping between the co-ordinate space of the mesh data and the image space of an image to be rendered onto the mesh surface; and modifying texture co-ordinate data to associate vertices of the mesh with locations in image space which differ from the locations identified by the unmodified texture co-ordinate data by amounts corresponding to a projection of the determined spatial error vector associated with a vertex to the image space in accordance with the determined mapping.

The present invention is particularly applicable to modification of texture co-ordinate data associated with triangle mesh data where such as in PRC-HCT encoding, the encoding of triangles in the mesh comprises generating data defining the relative locations of triangles and rounding data representing said triangles to within a geometric tolerance.

In some embodiments the mapping between co-ordinate space and image space may be known in advance and the known mapping may be used to modify texture co-ordinate data.

Where a mapping between co-ordinate space and image space is not known in advance, determining a mapping between a co-ordinate space and an image space may comprise analyzing the spatial co-ordinates of vertices of a mesh surface in a co-ordinate space and the texture co-ordinate data associating vertices of the mesh with locations in an image to be rendered onto the mesh surface to determine a mapping. In such embodiments analyzing the spatial co-ordinates and texture co-ordinates may comprise identifying correlations between variations in spatial co-ordinates of vertices identified by mesh data and image locations associated with said vertices by co-ordinate data to determine a mapping between the co-ordinate space and image space. In such embodiments the identified correlations may be utilized to identify the existence of mappings such as planar mappings between the co-ordinate and image spaces.

In some embodiments a mapping between co-ordinate space and image space may be determined by for each vertex in a mesh surface: identifying a plane in co-ordinate space containing the vertices of a polygon in the mesh which includes the vertex; determining a projection of the spatial position of a corresponding vertex in a mesh surface generated from an encoded representation of the mesh data to the identified plane; and estimating modified texture co-ordinates for the vertex on the basis of the determined projection to the identified plane and the texture co-ordinates associated with the vertices of the polygon defining the plane.

In some embodiments estimated modified texture co-ordinates may be determined based on projection to planes for each polygon which includes a vertex and the average of estimated texture co-ordinates may be utilized as modified texture co-ordinates for a vertex.

In a further aspect the present invention also provides a data processing apparatus comprising: a data store operable to store mesh data defining the spatial co-ordinates of vertices of a mesh surface in a co-ordinate space and texture co-ordinate data associating vertices of the mesh surface with locations in an image space of image to be rendered onto the mesh surface; and a co-ordinate modification module operable to: determine spatial error vectors identifying the differences between spatial co-ordinates of vertices of the mesh surface as defined by stored mesh data and the spatial co-ordinates of corresponding vertices in a mesh surface generated from an encoded representation of the mesh data; determine a mapping between the co-ordinate space of the mesh data and the image space of an image to be rendered onto the mesh surface; and modify stored texture co-ordinate data to associate vertices of a mesh defined by mesh data stored in the data store with locations in image space of an image to be rendered onto the mesh which differ from the locations identified by the unmodified texture co-ordinate data by amounts corresponding to the projection of the determined spatial error vector associated with a vertex to the image space in accordance with the determined mapping between the co-ordinate space and the image space.

Such a data processing apparatus may additionally comprise an encoding module operable to encode triangle mesh data wherein the encoding of triangles in the mesh comprises generating data defining the relative locations of triangles and rounding data representing said triangles to within a geometric tolerance and a data compression module operable to compress encoded triangle mesh data generated by the encoding module and modified texture co-ordinate data output by the co-ordinate modification module.

In a further aspect there is also provided a non-transient computer readable medium storing computer implementable instructions which when interpreted by a programmable computer cause the computer to become configured as a data processing apparatus comprising: a data store operable to store mesh data defining the spatial co-ordinates of vertices of a mesh surface in a co-ordinate space and texture co-ordinate data associating vertices of the mesh surface with locations in an image to be rendered onto the mesh surface; and a co-ordinate modification module operable to: determine spatial error vectors identifying the differences between spatial co-ordinates of vertices of the mesh surface as defined by stored mesh data and the spatial co-ordinates of corresponding vertices in a mesh surface generated from an encoded representation of the mesh data; determine a mapping between the co-ordinate space of the mesh data and the image space of an image to be rendered onto the mesh surface; and modify stored texture co-ordinate data to associate vertices of a mesh defined by mesh data stored in the data store with locations in image space of an image to be rendered onto the mesh which differ from the locations identified by the unmodified texture co-ordinate data by amounts corresponding to the projection of the determined spatial error vector associated with a vertex to the image space in accordance with the determined mapping between the co-ordinate space and the image space.

BRIEF DESCRIPTION OF THE DRAWINGS

Embodiments of the present invention will now be described with reference to the accompanying drawings in which.

DETAILED DESCRIPTION OF THE EMBODIMENTS

Figure 1:
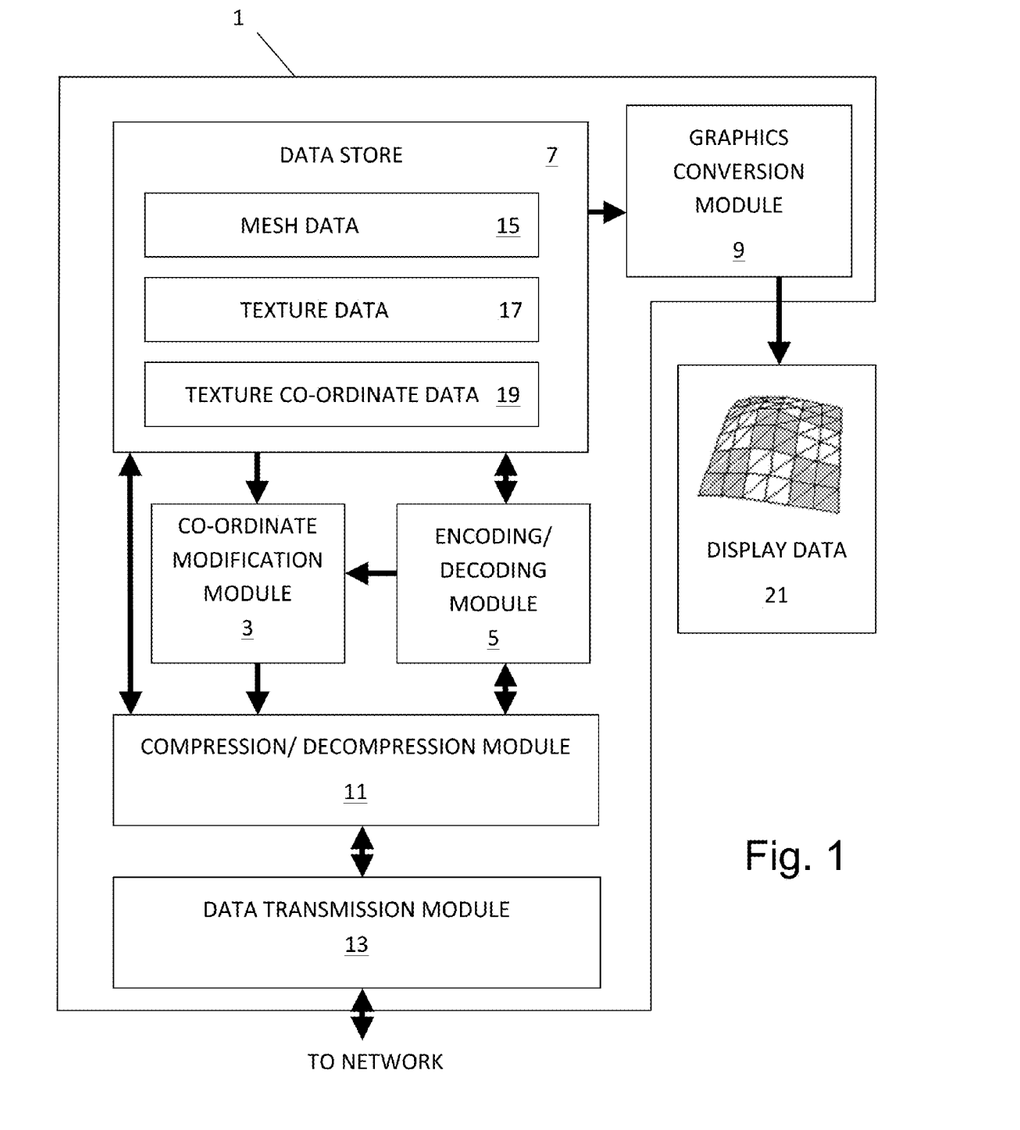
FIG. 1 is a schematic block diagram of computer system incorporating a co-ordinate modification module in accordance with an embodiment of the present invention.

FIG. 1 is a schematic block diagram of a computer system 1 incorporating a co-ordinate modification module 3 which as will be described enables improved representations of texture rendered wire mesh models to be created which permit greater levels of compression of such models.

In addition to the co-ordinate modification module 3, the computer system 1 also comprises: an encoding/decoding module 5, a data store 7, a graphics conversion module 9, a compression/decompression module 11 and a data transmission module 13.

The data store 7 is arranged to store data comprising: mesh data 15 which defines the geometry and connectivity of triangle mesh surface; texture data 17 which in this embodiment comprises a 2D image of texture to be rendered onto the surface defined by the mesh data 15; and texture co-ordinate data 19 which define a mapping between vertices of the surface defined by the mesh data 15 and positions within the texture data to identify portions of the texture data 17 to be applied to each triangle in the triangle mesh surface.

The graphics conversion module 7 is arranged to process the data 15-19 stored in the data store 7 and generate a display data 21 being a visual representation of the wire mesh model rendered using the texture data 17 and the texture co-ordinate data 19.

Detailed model data can be of a significant size. For that reason if such data is to be transmitted to another computer via a communications network or stored, the data needs to be compressed. In this embodiment this is achieved by the encoding/decoding module 5 and compression/decompression module 11 which in this embodiment comprise a conventional PRC-HCT encoding module and a conventional compression module for compressing data using the Deflate algorithm in zLib. This compressed data can then be transmitted to another computer or to storage by the data transmission module 13.

During the PRC-HCT mesh compression of triangle data structures undertaken by the encoding/decoding module 5, digital representations of 3D shapes are represented by tessellated triangle faces in a geometric mesh, or triangle mesh. This triangle mesh is processed where successive adjacent triangles are stored in a binary edge tree, by adding a relative vector between the next non-stored point and the mid-point of the shared edge, to describe the next neighbor triangle. This vector is then quantized, rounded to suitable reduced precision numerical value storage, within a geometric tolerance of the original vertex position. Such tolerance based geometric position reduction introduces small 3D displacement errors on the geometric surface.

Figure 2A:
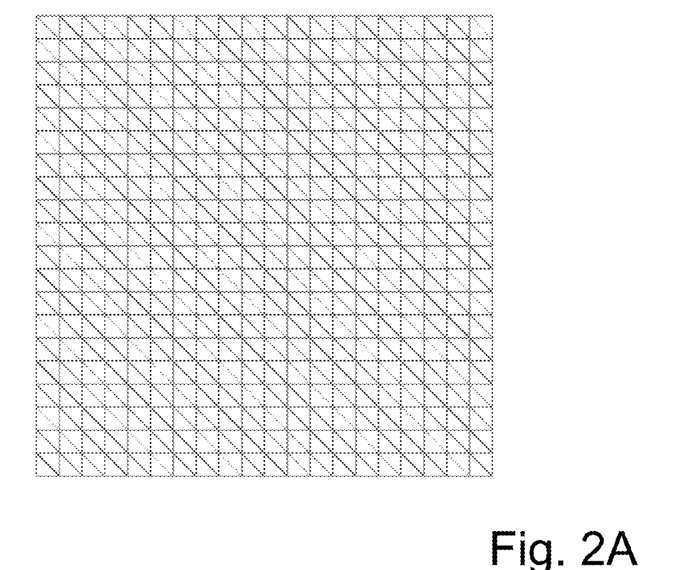
FIG. 2A is a plan view of an exemplary wire mesh model.
Figure 2B:
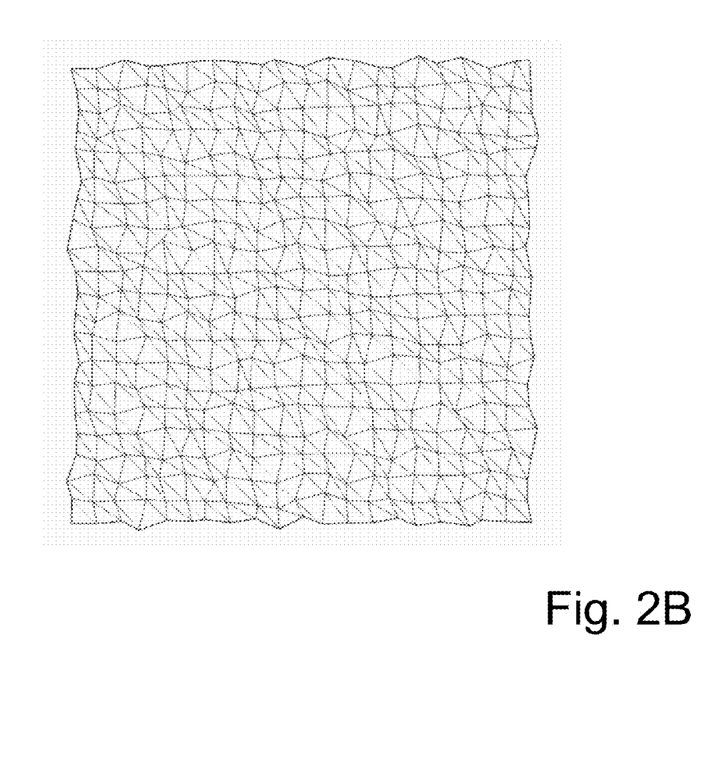
FIG. 2B is a plan view of a reconstruction of the exemplary wire mesh model of FIG. 2A from compressed data illustrating the introduction of errors which arise in encoding and compression processes.
Figure 3A:
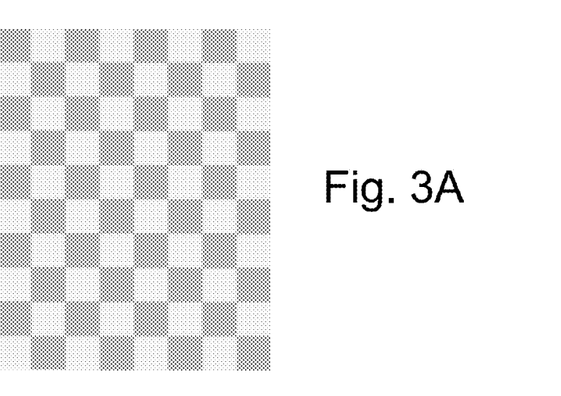
FIG. 3A is a representation of a rendering of a checkerboard pattern onto the surface of FIG. 2A.
Figure 3B:
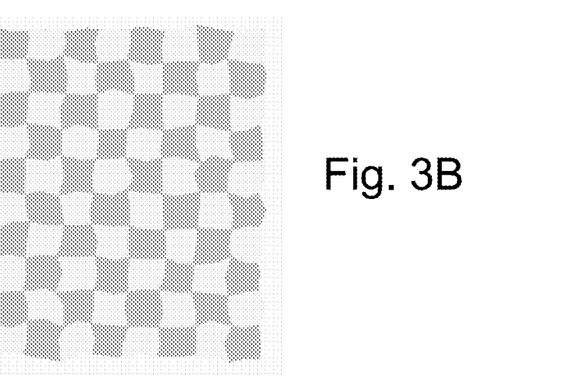
FIG. 3B is a representation of the rendering of the checkerboard pattern of FIG. 3A on the surface of FIG. 2B.
Figure 3C:
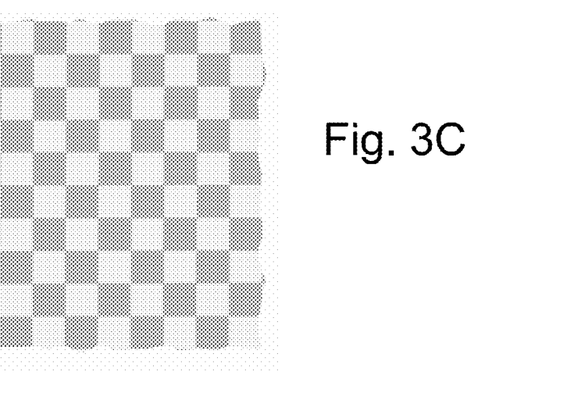
FIG. 3C is a representation of the checkerboard pattern of FIG. 3A on the surface of FIG. 2B using a modified set of texture co-ordinates.

FIGS. 2 and 3 illustrate the effect of such displacement errors on the representation of an exemplary wire mesh model and an exemplary checkerboard texture render pattern.

FIG. 2A is a plan view of an exemplary wire mesh model comprising a regular grid defining a flat surface.

FIG. 2B is a plan view of a reconstruction of the exemplary wire mesh model of FIG. 2A from compressed data illustrating the introduction of small displacement errors such as arise in the encoding and compression processes. As can be seen in this illustration encoding introduces minor errors into the geometry data for the grid.

The effect of such errors on the appearance of a texture rendered wire mesh model is illustrated in FIGS. 3A and 3B.

FIG. 3A is a representation of a rendering of a checker board pattern onto the surface of FIG. 2A, whereas FIG. 3B is a representation of the rendering of the same checker board pattern of FIG. 3A on the surface of FIG. 2B.

As can be seen from FIGS. 3A and 3B the effect of the distortions of the wire mesh grid which arise from the encoding process cause corresponding distortions to appear in a rendering of an image. Thus for example, comparing FIGS. 2A, 2B, 3A and 3B, errors in the encoding of a wire mesh result in the regular grid pattern of FIG. 3A becoming distorted as is shown in FIG. 3B when it is rendered onto the surface of FIG. 2B.

The applicants have appreciated that the identification of the spatial errors which arise in the encoding/compression process provide an opportunity to increase the fidelity of model representation or alternatively to obtain further reductions in the data required to represent a texture rendered wire mesh model.

More specifically, as will be explained, the present invention identifies the spatial errors arising during mesh compression and encoding and then utilizes the identified errors to adjust the texture co-ordinate data 19 to be associated with a compressed model to compensate for such errors.

Thus for example, in the case of the examples of FIGS. 2 and 3, the effect of such modification would be to modify the appearance of the texture rendered image of FIG. 3B to become the representation of FIG. 3C. As can be seen in FIG. 3C, modifying the texture co-ordinates restores most of the regular appearance of the original image of FIG. 3A.

Such correction may either be utilized to achieve a more accurate and faithful rendition of the original model or alternatively the modified texture co-ordinates may be subjected to truncation and approximation enabling higher rates of data compression to be achieved.

Thus for example, whereas original uncompressed texture co-ordinates might be represented by a pair of 4-byte (32-bit) floating point precision integers, they might be truncated to a pair of 2-byte (16-bit) integers, resulting in substantially reduced storage and transmission costs. Ordinarily, any such truncation approximation of uv texture co-ordinates would be additive to errors from spatial distortion. However, by processing the texture co-ordinates in advance to correct for the errors arising due to spatial distortions arising from mesh encoding and compression greater levels of truncation can be permitted for a permitted level of error.

The processing undertaken by the co-ordinate modification module 3 will now be described in detail with reference to FIGS. 4A-C and 5.

Figure 4A:
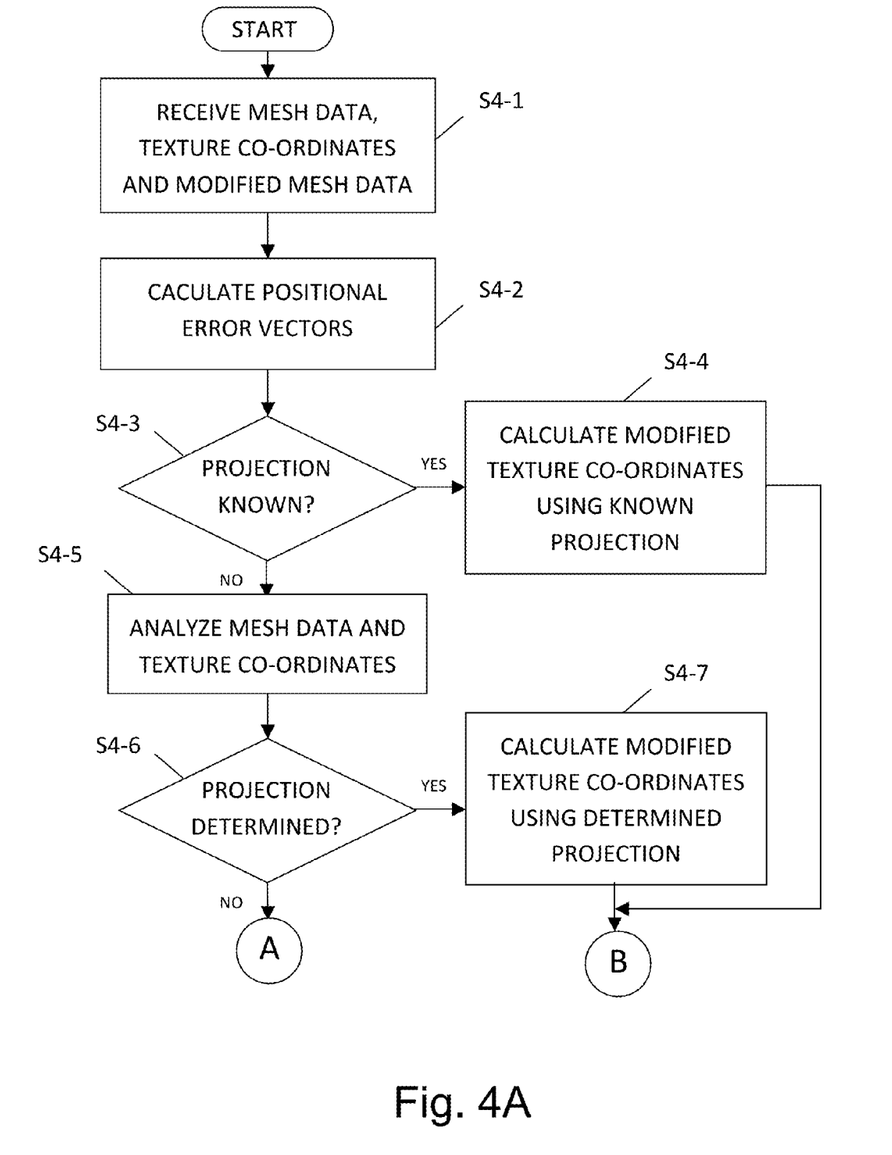
FIGS. 4A, 4B and 4C are a flow diagram of the processing of the co-ordinate modification module of FIG. 1 to determine a set of modified texture co-ordinates.

Turning first to FIG. 4A, in this embodiment, the co-ordinate modification module 3 is invoked when the encoding/decoding module 5 has finished processing the mesh data 15. When invoked, as an initial step (s4-1) the co-ordinate modification module 3 receives (s4-1) mesh data 15 and texture co-ordinate data 19 from the data store 7 and modified mesh data from the encoding/decoding module 5. Both the original mesh data 15 received from the data store 7 and the modified mesh data received from the encoding/decoding module 5 comprise data defining the 3D locations of vertices in the wire mesh being modeled. The original mesh data 15 received from the data store 7 will identify the positions of the vertices as they are recorded in the original mesh data 15. The modified mesh data received from the encoding/decoding module 5 will identify the locations of the vertices as they are represented in model data which is to be reconstructed from data output by the data transmission module 13.

As noted above due to approximations in the encoding process the locations associated with corresponding vertices in the original and modified mesh data will differ slightly from one another.

When data has been received, the co-ordinate modification module 3 then (s4-2) proceeds to calculate a set of positional error correction vectors.

More specifically, the co-ordinate modification module 3 proceeds to compare the 3D co-ordinates for each vertex in the wire mesh model as defined in the original mesh data 15 with the 3D co-ordinates for the corresponding vertex in the modified mesh data which is to be output by the data transmission module 13. The co-ordinate modification module 3 then records an error vector for each vertex recording the difference in position for the vertex as defined by the original mesh data 15 and the position for the vertex to be output by the data transmission module 13.

When error vectors have been determined for all of the vertices in the mesh being processed, the co-ordinate modification module 3 then (s4-3) checks whether the projection linking positions in 3D space and positions of point in the texture data 17 are known. If this is the case the co-ordinate modification module 3 then proceeds to utilize the projection and the error vectors to modify the texture co-ordinate data 19 received from the data store 7 so that the texture co-ordinate data 19 identify parts of the texture data 17 corresponding to the actual positions of vertices as identified by data output by the data transmission module 13 rather than the positions of vertices identified by the mesh data 15 in the data store 7.

Figure 5:
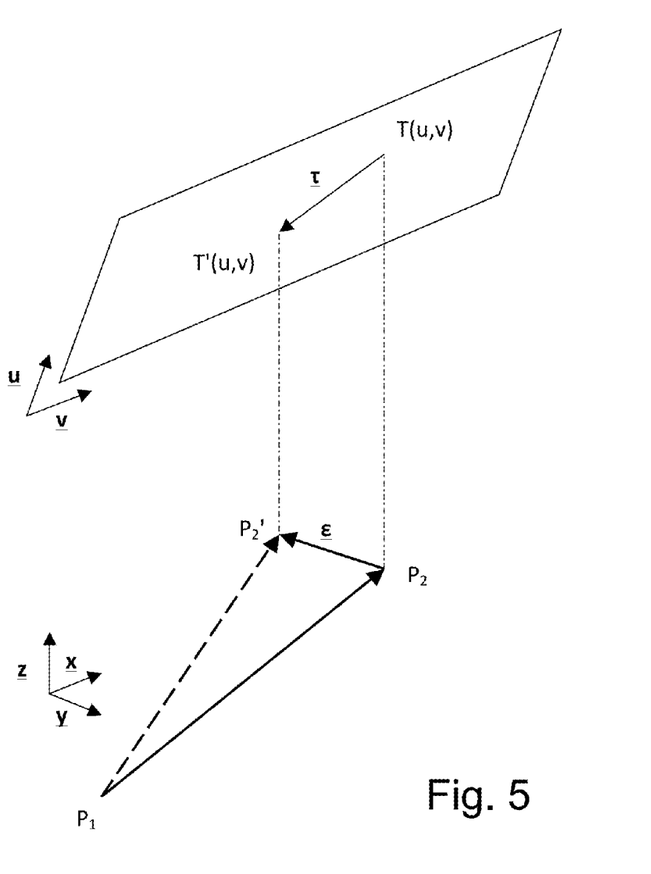
FIG. 5 is a schematic diagram for explaining the relationships between spatial errors arising when encoding mesh data and modified texture co-ordinates.

As shown in FIG. 5, in conventional PRC-HRT encoding, the 3D position of a second point in a wire mesh model $P_2$ is encoded by storing data defining the vector connecting a previously encoded point $P_1$ with the point being encoded $P_2$ (i.e. data recording the vector $P_2$-$P_1$ is recorded). However, as a result of truncation approximation or other processing, frequently rather than storing data for the vector $P_2$-$P_1$, data for a modified vector is $P'_2$-$P_1$ may be encoded in the data which is finally output with the result that the point is encoded as being at position $P'_2$ rather than position $P_2$. By comparing the actually encoded positions for vertices in a wire mesh with the positions as identified in output data, error vectors $\epsilon$ identifying the errors can be identified.

In the original texture co-ordinate data 19, point $P_2$ will be associated with a position $T(u,v)$ in the image defined by the texture data 17. However as the output mesh data associates the vertex being encoded with $P'_2$ rather than position $P_2$, the correct texture co-ordinates for the position actually being encoded will be at a different location $T'(u,v)$ in the image defined by the texture data 17 with the location of $T'(u,v)$ being offset from $T(u,v)$ by a texture co-ordinate error vector τ. If the relationships between the image plane containing the texture data 17 and the 3D dimensional space containing the positions of vertices in known then the correction vector τ in the image plane can be determined directly from the error vector ε in 3D space by noting the projection of the error vector ε into the image plane. The texture co-ordinates for the actual position identified by the output mesh data can then be determined by applying the correction τ in the image plane to the original texture mesh co-ordinates T(u,v) so that texture applied to the point corresponding to texture at position T'(u, v) rather than T(u,v). By making appropriate amendments to the texture co-ordinate data for all the vertices, the errors in visual appearance arising due to spatial encoding errors in encoding/compression can largely be eliminated.

It will be appreciated that where the relationship between 3D position space for vertices in the wire mesh and projections to the image plane are known, converting positional error vectors ε into texture co-ordinate corrections τ is relatively straight-forward and hence appropriate amendments can be made for all vertices in a mesh.

Frequently, however, the details of the mapping between points in 3D space and the image plane of the texture data 17 are not known in advance. Texture may be projected onto a surface in a vast number of ways. However, it is most common that some form of planar projection is used where texture data 17 is effectively projected onto a model in the manner of a slide projector onto a 3D surface from a particular direction with other more complex projections such as spherical or distorted projections being less common. It is therefore often possible if the projection in question is not known to determine a projection by (s4-5) analyzing the relationships between the 3D positions of vertices in the mesh data 15 and the u,v positions identified by texture co-ordinates 17 received from the data store 7. This can be achieved by analyzing the manner in which u,v co-ordinates vary depending upon variations in 3D position.

Thus for example a frequently used projection in the case of an elevation mesh where mesh vertices are arranged on a regular 2D grid is to use a projection where texture data 17 is effectively projected onto a surface from a plane lying parallel to the x and y axes. The existence of such a projection can be identified by considering the manner in which u,v positions vary dependent upon variations in x,y,z position data. In such an example, it would be possible to determine that for example u values varied monotonically with variations in x co-ordinate, v values varied monotonically with variations in y co-ordinate and no pattern of variation in z co-ordinate was apparent. Whereas a simple planar projection in the manner described is particularly easy to identify it will be appreciated that by comparing identified correlations between changes in 3D position and u,v texture co-ordinates other more complex projections can be identified.

If the projection connecting the texture co-ordinates can be identified (s4-6), modified texture co-ordinates can then (s4-7) be calculated in a similar manner as has previously been described (s4-4) using the calculated error vectors ε and the determined projection.

Although analysis of correlations between 3D positions and u,v texture co-ordinates can enable many projections to be identified, such analysis will normally only identify projections which apply globally to an entire surface. Sometimes, in particular where texture co-ordinates encode scientific data, no global projection exists and attempting to identify such a projection will be unsuccessful.

If analysis (s4-5) of the mesh data 15 and the texture co-ordinate data 19 does not reveal (s4-6) a projection to be used an estimation of the appropriate projection needs to be made.

Figure 4B:
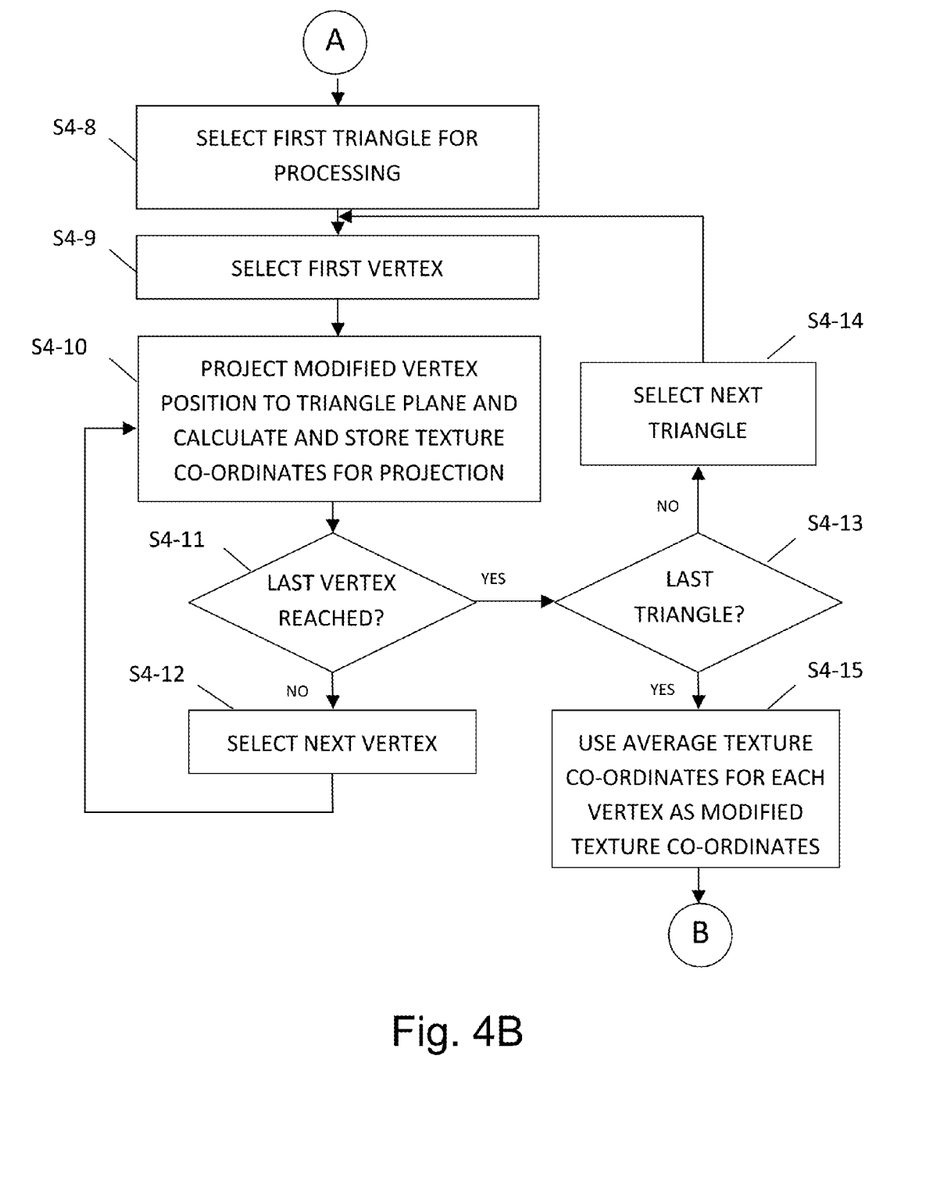

FIG. 4B illustrates the processing undertaken by the co-ordinate modification module 3 in this embodiment to determine an estimate. In this embodiment, where no global projection can be identified, the co-ordinate modification module 3 determines an estimate of the corrections to be made based on the fact that the texture applied to individual triangles in a triangle mesh model are identified by the texture co-ordinates associated with the vertices of each of the triangles in the mesh.

In order to determine estimated texture co-ordinates, initially, (s4-8), the co-ordinate modification module 3 selects a first triangle for processing and then selects (s4-9) an initial vertex from that triangle.

The actual 3D position of the selected vertex as identified in the modified mesh data received from the encoding/decoding module 5 is then (s4-10) considered.

If the 3D co-ordinates for a vertex lie within the triangle plane currently being processed, the co-ordinate modification module 3 identifies the point in the texture data 17 corresponding to the output vertex location and records co-ordinate data for that point as a potential texture co-ordinate data for the vertex.

More frequently, the spatial errors introduced during encoding and compression will identify a position which lies outside of the original triangle plane. If this is the case, the co-ordinate modification module 3 determines a projection of the output of the vertex being considered onto the plane containing the original locations of vertices of the triangle currently being processed.

This can be achieved by re-expressing the 3D co-ordinates of the vertex being processed in terms of a co-ordinate system based on three basis vectors. Where the triangle being processed is associated with original mesh data 15 which identifies the vertices of the triangle as being at points $P_1$, $P_2$, and $P_3$, these basis vectors are $P_2-P_1$, $P_3-P_1$ and $(P_2-P_1)\times(P_3-P_1)$, where the origin for the basis vectors is chosen from a vertex of the triangle, typically as $P_1$. A projection of a vertex as identified in output data on to the plane containing points $P_1$, $P_2$, and $P_3$ can then be made by representing the position of the vertex in the co-ordinate system of the three basis vectors and then setting the co-ordinate value for the final basis vector $(P_2-P_1)\times(P_3-P_1)$ to zero. This will then identify a point in the plane containing the triangle $P_1$, $P_2$, and $P_3$. Estimated texture co-ordinates for the projection of the output position of a vertex into the plane containing the triangle being processed can then be determined by considering the mapping of texture co-ordinates to the plane containing points $P_1$, $P_2$, and $P_3$ defined by the original texture co-ordinate data 19 associated with the triangle being processed.

Having generated estimated texture co-ordinates for a vertex, the co-ordinate modification module 3 then checks (s4-11) whether texture co-ordinates for the actual positions for all three vertices of the triangle currently being process have been determined. If this is not the case, the next vertex in the triangle being processed is selected (s4-12) and estimated texture co-ordinates for that vertex are determined (s4-10).

When the co-ordinate modification module 3 determines (s4-11) that estimated texture co-ordinates for all three vertices in a triangle have been calculated, the co-ordinate modification module 3 then checks (s4-13) whether all of the triangles on the triangle mesh have been processed.

If this is not the case, the next triangle in the triangle mesh is selected (s4-14) and then the co-ordinate modification module 3 then proceeds (s4-9-s4-12) to generate estimated texture co-ordinates for all three vertices in the newly selected triangle.

When the co-ordinate modification module 3 determines (s4-13) that all the triangles in a triangle mesh have been processed, a set of estimated texture co-ordinates will be stored for each vertex in the mesh. This will comprise a pair of estimated texture co-ordinates for a vertex for each triangle in the triangle mesh containing that vertex. Thus for example if a particular vertex is shared by three triangles, three sets of estimated texture co-ordinates will be stored. The co-ordinate modification module 3 then (s4-15) determines a final estimated modified texture co-ordinate for each vertex by, in this embodiment, taking an average of the estimated u,v co-ordinates determined for that vertex.

Where a global projection between 3D space and a texture plane cannot be determined, calculating modified texture co-ordinates in the way described enables an estimate of an appropriate correction to be made. In general the spatial distortions ϵ which arise from encoding and compressing mesh data 15 are not very large. It is therefore a reasonable to approximate the projection of spatial distortions by considering the projection of modified points into planes containing original triangle positions and then extrapolating texture co-ordinates for such projections based on the original texture co-ordinates for the original points. Where this is done for each of the triangles which share a vertex, an estimate of texture co-ordinates for a modified point can be made by taking an average of the calculated estimates. Determining such an average by per-component averaging minimizes the sum of squared errors compared with the initial estimates.

Figure 4C:
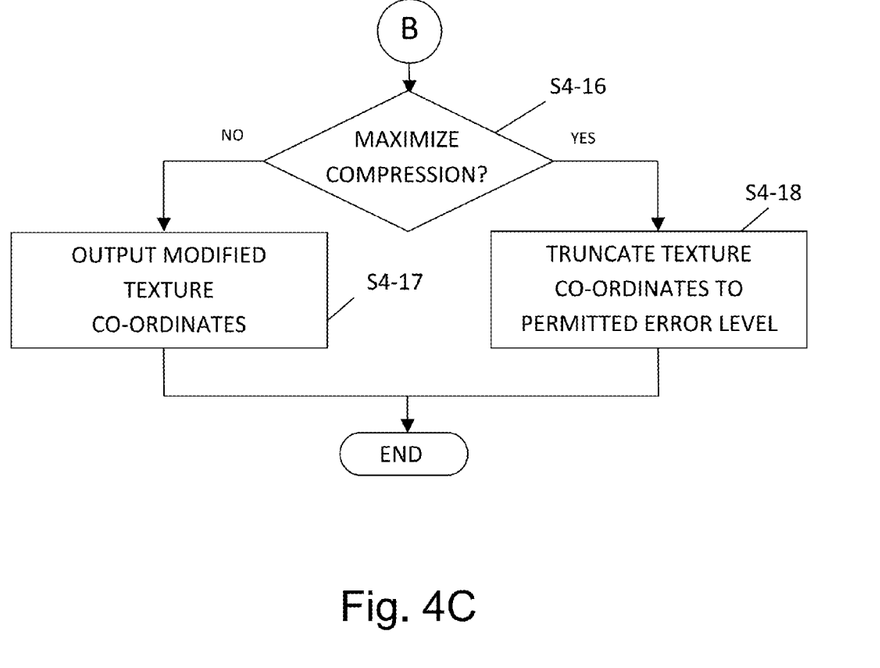

Turning to FIG. 4C, having processed the mesh data 15 and texture co-ordinate data 19 from the data store 7 and modified mesh data from the encoding/decoding module 5, the co-ordinate modification module 3 will have calculated a modified set of texture co-ordinate data 19 which accounts for the introduction of spatial errors in the encoding a compression of the mesh by the encoding/decoding module 5 and the compression module 11.

These modified co-ordinates may have been determined based on a known relationship between texture render data 17 and positions in 3D model space (s4-4). Alternatively the modified texture co-ordinates may be based on the identification of a relationship between texture render data 17 and positions in 3D model space derived from analysis of mesh data 15 and unmodified texture co-ordinate data 19 (s4-7) or alternatively they may be based on estimates of modified texture co-ordinates based on the projection of points to planes containing triangles in the triangle mesh (s4-8-s4-15).

Having determined modified texture co-ordinates for all the vertices in a wire mesh model, the co-ordinate modification module 3 then (s4-16) determines whether these modified texture co-ordinates are to be utilized to reduce the appearance of distortion of a texture rendered mesh or whether the modified texture co-ordinates are to be utilized to achieve improved level of data compression.

If the co-ordinate modification module 3 determines that the modified texture co-ordinates are to be utilized to reduce the appearance of distortion of a texture rendered mesh, the modified texture co-ordinates are output (s4-17) to the compression/decompression module 11 for compression using conventional techniques before compressed mesh data 15, texture data 17 and texture co-ordinate data 19 are passed to the data transmission module 13. As noted above, the modification of texture co-ordinates in this way removes some of the errors which appear due to the encoding and compression of a mesh surface and hence improve the fidelity of a surface being rendered.

If the co-ordinate modification module 3 determines that the modified texture co-ordinates are to be utilized to achieve improved level of data compression, the co-ordinate modification module 3 proceeds (s4-18) to reduce the volume of the modified texture co-ordinates by truncating each item of co-ordinate data prior to sending the truncated modified texture co-ordinates to the compression/decompression module 11 for compression and dispatch by the data transition module 13.

The applicants have appreciated that any errors which occur due to the introduction of spatial errors in the encoding of a wire mesh model and the truncation of texture co-ordinate data are cumulative. As generating modified texture co-ordinates removes most of the errors in appearance which arise due to spatial errors in mesh encoding, this then means that a similar quality of texture rendered wire mesh can be achieved using less accurate representations of the modified u,v texture co-ordinates.

To evaluate the performance of the system an error value representative of the apparent distortion of a model was determined. More specifically to evaluate the system, two dimensional distance values were calculated for the distance in u,v space between the exact corrected texture co-ordinates calculated for each vertex of an exemplary model and the position in u,v, coordinate space identified by either unmodified texture co-ordinate data or a position identified after texture co-ordinates had been truncated to a certain degree. An overall error value for the exemplary model was then calculated by summing the calculated distance measures for all of the vertices of the model resulting in the following:

|  | Total error value |
|---|---|
| Original texture co-ordinates with 23 bits after the binary radix point | 14.961 |
| Modified texture co-ordinates with 23 bits after the binary radix point | 0.046 |
| Modified texture co-ordinates truncated to 18 bits after the binary radix point | 0.066 |
| Modified texture co-ordinates truncated to 14 bits after the binary radix point | 0.753 |
| Modified texture co-ordinates truncated to 10 bits after the binary radix point | 12.057 |
| Modified texture co-ordinates truncated to 9 bits after the binary radix point | 24.079 |

As can be seen from the above, modifying texture co-ordinates to correct for spatial encoding errors substantially reduces the appearance of such errors and hence reduces error levels from almost 15 to less than 0.05. As would be expected truncating modified texture co-ordinates increases the appearance of error. However, texture co-ordinates can be truncated to around 9-10 bits after the binary radix point before errors similar to those which arise in conventional unprocessed data re-appear.

Typically texture co-ordinate data is stored as a pair of 4 byte, 32-bit floating point precision integers for each vertex in a triangle mesh. Such co-ordinate data can account for around three quarters of the data needed to represent a texture rendered wire mesh model. Truncation of such data can result in significant levels of data compression. Thus for example in the case of an exemplary mesh the following were achieved.

| | File size after compression | Error |
|---|---|---|
| Original data truncated to 15 bits after the binary radix point | 78.2 KB | 14.98 |
| Modified texture co-ordinates truncated to 15 bits after the binary radix point | 78.5 KB | 0.38 |
| Modified texture co-ordinates truncated to 10 bits after the binary radix point | 62.9 KB | 12.06 |

Thus as can be seen, utilizing modified texture co-ordinates in the manner discussed and truncating texture co-ordinates to 15 bits after the binary radix point largely removes errors in appearance (error reduced from 14.98 to 0.38) at the cost of a marginally increased file size (78.5 KB v 78.2 KB). In contrast utilizing modified texture co-ordinates and reducing the numbers of bits after the binary radix point from 23 to 10 results in a slightly more accurate representation than that which is achieve without amending the texture co-ordinates (error reduced from 14.98 to 12.06) and an approximately 20% reduction in file size.

FURTHER ALTERNATIVES AND EMBODIMENTS

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier could be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

What is claimed is:

1. A computer implemented method of processing mesh data defining the spatial co-ordinates in a co-ordinate space of vertices of a mesh surface and texture co-ordinate data associating vertices of a mesh surface with locations in an image space of an image to be rendered onto the mesh surface, the method comprising:
    using a computer to
    determine for each of the vertices of a mesh surface represented by mesh data, spatial error vectors identifying the differences in between spatial co-ordinates of vertices of the mesh surface as defined by the mesh data and the spatial co-ordinates of corresponding vertices in a mesh surface generated from an encoded representation of the mesh data;
    determine a mapping projection between the co-ordinate space of the mesh data and the image space of an image to be rendered onto the mesh surface; and
    modify texture co-ordinate data to associate vertices of the mesh with locations in image space which differ from the locations identified by the unmodified texture co-ordinate data by amounts corresponding to a projection of the determined spatial error vector associated with a vertex to the image space in accordance with the determined mapping.

2. The method of claim 1 wherein determining a mapping between co-ordinate space and image space comprises identifying a known mapping between the co-ordinate space of the mesh data and locations in an image to be rendered onto a mesh surface.

3. The method of claim 1 wherein determining a mapping between co-ordinate space and the image space comprises analyzing the spatial co-ordinates of vertices of a mesh surface in a co-ordinate space and the texture co-ordinate data associating vertices of the mesh with locations in an image to be rendered onto the mesh surface to determine a mapping between the co-ordinate space of the mesh data and the image space of an image to be rendered onto the mesh surface.

4. The method of claim 3 wherein the analysis of spatial co-ordinates and texture co-ordinate data comprises identifying correlations between variations in spatial co-ordinates of vertices identified by mesh data and image locations associated with said vertices by co-ordinate data to determine a mapping between the co-ordinate space and image space.

5. The method of claim 4 wherein said mapping comprises a planar mapping and the analysis of spatial co-ordinates and texture co-ordinate data comprises utilizing said identified correlations to determine said planar mapping.

6. The method of claim 1 wherein determining a mapping between co-ordinate space and image space comprises, for each vertex in a mesh surface:
    identifying a plane in co-ordinate space containing the vertices of a polygon in the mesh which includes the vertex;
    determining a projection of the spatial position of a corresponding vertex in a mesh surface generated from an encoded representation of the mesh data to the identified plane; and
    estimating modified texture co-ordinates for the vertex on the basis of the determined projection to the identified plane and the texture co-ordinates associated with the vertices of the polygon defining the plane.

7. The method of claim 6 wherein determining a mapping between co-ordinate space of and image space comprises:
    estimating modified texture co-ordinates for each vertex for each polygon which includes the vertex; and
    utilizing as modified texture co-ordinates the average texture co-ordinates determined for a vertex.

8. The method of claim 1 further comprising truncating the modified texture co-ordinates.

9. The method of claim 1 wherein said mesh data comprises triangle mesh data and wherein the encoding of triangles in the mesh comprises generating data defining the relative locations of triangles and rounding data representing said triangles to within a geometric tolerance.

10. The method of claim 9 wherein said encoding comprises a PRC-HOT encoding.

11. A data processing apparatus comprising:
    a data store operable to store mesh data defining the spatial co-ordinates of vertices of a mesh surface in a co-ordinate space and texture co-ordinate data associating vertices of the mesh surface with locations in an image space of image to be rendered onto the mesh surface; and a computer processing module comprising a co-ordinate modification module operable to:
- determine spatial error vectors identifying the differences between spatial co-ordinates of vertices of the mesh surface as defined by stored mesh data and the spatial co-ordinates of corresponding vertices in a mesh surface generated from an encoded representation of the mesh data;
- determine a mapping projection between the co-ordinate space of the mesh data and the image space of an image to be rendered onto the mesh surface; and
- modify stored texture co-ordinate data to associate vertices of a mesh defined by mesh data stored in the data store with locations in image space of an image to be rendered onto the mesh which differ from the locations identified by the unmodified texture co-ordinate data by amounts corresponding to the projection of the determined spatial error vector associated with a vertex to the image space in accordance with the determined mapping between the co-ordinate space and the image space.

12. The data processing apparatus of claim 11 wherein the co-ordinate modification module is operable to:
determine a mapping between co-ordinate space and image space by analyzing the spatial co-ordinates of vertices of a mesh surface in a co-ordinate space and the texture co-ordinate data associating those vertices with locations in image space.

13. The data processing apparatus with claim 12 wherein the co-ordinate modification module is operable to:
identify correlations between variations in spatial co-ordinates of vertices identified by mesh data and image locations associated with said vertices by co-ordinate data to determine a mapping between the co-ordinate space and image space.

14. The data processing apparatus of claim 13 wherein the co-ordinate modification module is operable to identify a mapping which comprises a planar mapping.

15. The data processing apparatus of claim 11 wherein the co-ordinate modification module is operable to determine a mapping between co-ordinate space and image space by:
- identifying a plane containing a polygon in the mesh which includes a vertex;
- determining a projection of the spatial position of a corresponding vertex in a mesh surface generated from an encoded representation of the mesh data to the identified plane; and
- estimating modified texture co-ordinates for the vertex on the basis of the determined projection to the identified plane and the texture co-ordinates associated with the vertices of the polygon defining the plane.

16. The data processing apparatus of claim 15 wherein the co-ordinate modification module is operable to:
- estimate modified texture co-ordinates for a vertex for each polygon which includes the vertex; and
- output as modified texture co-ordinates for the vertex, the average texture co-ordinates determined for the vertex.

17. The data processing apparatus of claim 11, wherein the co-ordinate modification module is operable to truncate the modified texture co-ordinates.

18. The data processing apparatus of claim 11 further comprising an encoding module operable to encode triangle mesh data wherein the encoding of triangles in the mesh comprises generating data defining the relative locations of triangles and rounding data representing said triangles to within a geometric tolerance.

19. The data processing apparatus of claim 18 further comprising a data compression module operable to compress encoded triangle mesh data generated by the encoding module and modified texture co-ordinate data output by the co-ordinate modification module.

20. A non-transient computer readable medium storing computer implementable instructions which when interpreted by a programmable computer cause the computer to become configured as a data processing apparatus comprising:
a data store operable to store mesh data defining the spatial co-ordinates of vertices of a mesh surface in a co-ordinate space and texture co-ordinate data associating vertices of the mesh surface with locations in an image to be rendered onto the mesh surface; and
a co-ordinate modification module operable to:
- determine spatial error vectors identifying the differences between spatial co-ordinates of vertices of the mesh surface as defined by stored mesh data and the spatial co-ordinates of corresponding vertices in a mesh surface generated from an encoded representation of the mesh data;
- determine a mapping projection between the co-ordinate space of the mesh data and the image space of an image to be rendered onto the mesh surface; and
- modify stored texture co-ordinate data to associate vertices of a mesh defined by mesh data stored in the data store with locations in image space of an image to be rendered onto the mesh which differ from the locations identified by the unmodified texture co-ordinate data by amounts corresponding to the projection of the determined spatial error vector associated with a vertex to the image space in accordance with the determined mapping between the co-ordinate space and the image space.

21. The non-transient computer readable medium of claim 20 wherein the co-ordinate modification module is operable to:
analyze the spatial co-ordinates vertices of a mesh surface in a co-ordinate space and the texture co-ordinate data associating vertices of the mesh with locations in an image to be rendered onto the mesh surface to determine a mapping between the co-ordinate space of the mesh data and the image space of an image to be rendered onto the mesh surface.

22. The non-transient computer readable medium claim 21 wherein the co-ordinate modification module is operable to:
identify correlations between variations in spatial co-ordinates of vertices identified by mesh data and image locations associated with said vertices by co-ordinate data to determine a mapping between the co-ordinate space and image space.

23. The non-transient computer readable medium of claim 22 wherein the mapping comprises a planar mapping.

24. The non-transient computer readable medium of claim 20 wherein the co-ordinate modification module is operable to determine a mapping between the co-ordinate space of the mesh data and the image space of an image to be rendered onto the mesh surface by:
identifying a plane containing a polygon in the mesh which includes a vertex;

determining a projection of the spatial position of a corresponding vertex in a mesh surface generated from an encoded representation of the mesh data to the identified plane; and estimating modified texture co-ordinates for the vertex on the basis of the determined projection to the identified plane and the texture co-ordinates associated with the vertices of the polygon defining the plane.

25. The non-transient computer readable medium of claim 24 wherein the co-ordinate modification module is operable to:

estimate modified texture co-ordinates for a vertex for each polygon which includes the vertex; and output as modified texture co-ordinates for the vertex, the average texture co-ordinates determined for the vertex.

26. The non-transient computer readable medium of claim 20, wherein the co-ordinate modification module is operable to truncate the modified texture co-ordinates.

27. The non-transient computer readable medium of claim 20 further comprising an encoding module operable to encode triangle mesh data wherein the encoding of triangles in the mesh comprises generating data defining the relative locations of triangles and rounding data representing said triangles to within a geometric tolerance.

28. The non-transient computer readable medium of claim 27 further comprising a data compression module operable to compress encoded triangle mesh data generated by the encoding module and modified texture co-ordinate data output by the co-ordinate modification module.

* * * * *